United States Patent Office 2,953,576
Patented Sept. 20, 1960

2,953,576
COLOUR COUPLERS

Neville Slater Corby, Manchester, England, assignor to Imperial Chemical Industries Limited, London, England, a corporation of Great Britain No Drawing. Filed Jan. 10, 1958, Ser. No. 708,080

Claims priority, application Great Britain Jan. 16, 1957

1 Claim. (Cl. 260—345.2)

This invention relates to new colour couplers for use in colour photography.

The colour couplers conventionally used in colour photography for the formation of the yellow image give azomethine dyestuffs which suffer from the disadvantage of having an undesirable absorption in the green region of the spectrum.

According to the invention there are provided new colour couplers of the formula:

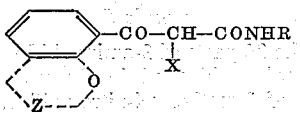

wherein R is an aryl radical, Z stands for the atoms of a saturated carbon chain which are required to complete a 5 or 6 membered heterocyclic ring and X is a hydrogen or a chlorine atom.

The aryl residue represented by R may be substituted for example by methoxy, carboxy, N-methyl-N-octadecylamino-, sulphondiethylamido-, nitro-, acylamino-, carboalkoxy-, aryloxy-, alkyl and sulpho- groups and halogen atoms.

The hydrogen atoms of the saturated carbon chain represented by Z may be substituted for example by methyl.

According to a further feature of the invention there is provided a process for the manufacture of the new colour couplers which do not contain an amino group in the aryl radical represented by R, which comprises heating an aromatic amine of the formula $RNH_2$ with an ester of the formula:

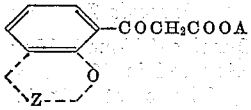

where R and Z have the meanings stated above and A is an alkyl radical, and if desired subsequently replacing a hydrogen of the $CH_2$ group by a chlorine atom.

The alkyl radical A may be for example methyl or ethyl.

This process of the invention may be conveniently carried out by heating the reagents together in a solvent which is inert under the conditions of the reaction for example xylene, chlorobenzene or pyridine, and the product may be isolated by distilling off some or all of the solvent, cooling and filtering.

The ester used in the process of the invention may be made by condensing the appropriate acid chloride of the formula:

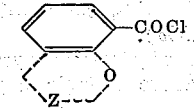

wherein Z has the meaning stated above, with an alkyl acetoacetate and a sodium alkoxide or a sodium alkylacetoactate and hydrolysing the product so obtained. The acid chloride may be obtained from the lithium derivative of the appropriate heterocyclic compound by treating with carbon dioxide, acidifying with hydrochloric acid, separating the carboxylic acid formed, and then reacting the carboxylic acid with thionyl chloride.

The carboxylic acid may also be obtained by ring-closure and subsequent hydrolysis of a 2-hydroxy-3-(β- or γ-bromoalkyl-)alkylbenzoate. The appropriate heterocyclic compound may be obtained by ring-closure of a 2-(β- or γ-bromoalkyl)phenol, or a 2-(β- or γ-hydroxyalkyl)phenol.

As examples of suitable esters of use in this process of the invention there may be mentioned ethyl and methyl (2 - methyl-2:3-dihydrobenzofuran-7-yl-carbonyl)acetate, ethyl- and methyl-(2:3:4-trihydrobenzopyran-8-yl-carbonyl)acetate, ethyl- and methyl-(2:3-dihydrobenzofuran-7-yl-carbonyl)acetate and ethyl- and methyl-(2-methyl-2:3:4-trihydrobenzopyran-8- yl - carbonyl)acetate, and as examples of suitable aromatic amines there may be mentioned 3-amino-4-N-methyl-N-octadecylaminobenzoic acid, 3-amino-4-methoxybenzenesulphondiethylamide, aniline, o-toluidine, α- and β-naphthylamine, 4-amino-diphenylether, 5-nitro-o-anisidine, sulphanilic acid, 3-amino-4-chlorobenzotrifluoride, and m-amino-dimethylisophthalate.

According to a further feature of our invention there is provided a process for the manufacture of those new colour couplers which contain an amino group in the aryl radical represented by R, which comprises treating a new colour coupler, as hereinbefore defined, containing a nitro group in the aryl radical represented by R with a reducing agent.

This process of the invention may be conveniently carried out by treating a solution of the nitro compound in a solvent, for example water or acetic acid, with a reducing agent, for example iron, and the amino compound so obtained may be isolated by filtering, distilling off some or all of the solvent, cooling and filtering.

According to a further feature of our invention there is provided a modified process for the manufacture of those new colour couplers which contain an acylamino group in the aryl radical represented by R which comprises treating a new colour coupler, as hereinbefore defined, containing an amino group in the aryl radical represented by R with an acylating agent.

This process of the invention may be conveniently carried out by treating a solution of the amino compound in a solvent, for example acetic acid, with an acylating agent for example benzoyl chloride or octadecenylsuccinic anhydride and isolating the product from the reaction mixture.

The new colour couplers of the invention may be used in the developing solution or they may be included in a light-sensitive layer. If desired the new colour couplers may be used in the form of their salts with an alkali metal, for example sodium or potassium.

It is preferred however, to include the new colour couplers of the invention in a light-sensitive gelatino-silver halide emulsion layer which forms part of a multi-layer film or paper of the kind used for colour photography. For this purpose it is preferred to use those new colour couplers which contain a water-solubilising group, for example a carboxylic acid or sulphonic acid group and a substituent rendering them fast to diffusion, for example an alkyl chain containing at least 16 carbon atoms.

Light-sensitive gelatino-silver halide emulsion layers containing the new colour couplers of the invention possess good chemical and photographic stability when such emulsion layers are stored prior to being exposed to light.

The colour couplers of the invention when treated, in the presence of an exposed silver halide emulsion, with a colour forming developer, which contains a primary aromatic amine developing agent, for example 2-amino-5-diethylamino-toluene, give yellow azomethine dyestuffs, which have a very low absorption in the green region of the spectrum.

The invention is illustrated but not limited by the following examples in which the parts are by weight.

*Example 1*

20 parts of 3-amino-4-N-methyl-N-octadecylaminobenzoic acid are dissolved in 140 parts of chlorobenzene and the solution is stirred and heated at 160° C. A solution of 12.4 parts of ethyl-(2-methyl-2:3-dihydrobenzofuran-7-yl-carbonyl)acetate and 2 parts of pyridine in 30 parts of chlorobenzene is added over 20 minutes. The solution is then heated and 40 parts of a mixture of chlorobenzene and ethanol are distilled off over 50 minutes. The mixture is boiled under a reflux condenser for 30 minutes and a further 60 parts of chlorobenzene are then distilled off during 40 minutes. The reaction mixture is cooled and the anilide which crystallises out is filtered off, washed with 200 parts of ether and recrystallised from 125 parts of n-butanol.

(2-methyl-2:3-dihydrobenzofuran-7-yl-carbonyl)-acetic-(2'-N-methyl-N-octadecylamino-5'-carboxy)-anilide is obtained in the form of white needle-shaped crystals which melt at 141°–143° C. On analysis the product is found to contain 72.8% of carbon, 9.1% of hydrogen and 4.5% of nitrogen (calculated for $C_{38}H_{56}O_5N_2$ carbon=73.4%; hydrogen=9.1%; nitrogen=4.5%).

The ethyl-(2-methyl-2:3-dihydrobenzofuran-7-yl-carbonyl)acetate used in the above example may be obtained by reacting 2-methyl-2:3-dihydrobenzofuran-7-yl-carbonylchloride with ethyl acetoacetate and sodium ethoxide by the general method described by Claisen (Annalen, 1896, volume 291, page 67) and hydrolysing the ethyl-(2-methyl-2:3-dihydrobenzofuran-7-yl-carbonyl)acetoacetate so formed with aqueous solution of ammonia and ammonium chloride at 35–40° C.

2-methyl-2:3-dihydrobenzofuran-7-yl-carbonylchloride may be obtained by reacting together thionyl chloride and 2-methyl-2:3-dihydrobenzofuran-7-carboxylic acid, which may be obtained by reacting 2-methyl-2:3-dihydrobenzofuran with butyl-lithium and treating the reaction mixture with carbon dioxide as described by Traynham (Chemical Abstracts, 1952, volume 46, page 965e) or by ring closure and subsequent alkaline hydrolysis of methyl-(2-hydroxy-3-β-bromopropyl)benzoate by the general method described by Arnold and Moran (Journal of the American Chemical Society 1942, volume 64, page 2986).

*Example 2*

In place of the 20 parts of 3-amino-4-N-methyl-N-octadecylaminobenzoic acid used in Example 1 there are used 13.9 parts of 3-amino-4-methoxybenzene-sulphondiethylamide. The (2-methyl-2:3-dihydrobenzofuran-7-yl-carbonyl)-acetic-(2'-methoxy-5'-sulphondiethylamido-)anilide so obtained crystallises from a mixture of ether and methanol in the form of white needle-shaped crystals which melt at 117°–119° C. On analysis the product is found to contain 60.1% of carbon, 6.1% of hydrogen and 6.1% of nitrogen (calculated for $C_{23}H_{28}O_6N_2S$ carbon=60.0%; hydrogen=6.1%; nitrogen=6.1%).

*Example 3*

200 parts of a 5% solution in methanol of the sodium salt of (2-methyl-2:3-dihydrobenzofuran-7-yl-carbonyl)-acetic-(2'-N-methyl-N-octadecylamino-5'-carboxy)anilide and 500 parts of a 7% aqueous solution of gelatine are added to 500 parts of a blue sensitive gelatino-silver halide emulsion which is stirred at 40° C. The emulsion so obtained is coated onto a paper base and the coated paper so obtained is dried. The photographic paper so obtained is exposed to blue light, developed in a colour developer containing 2-amino-5-diethylaminotoluene, bleached and fixed. A bright yellow azomethine dye image is obtained which has an absorption maximum at 428 millimicrons. This dyestuff shows less absorption in the green region of the spectrum than the dyestuff which has an absorption maximum of 440 millimicrons and which is obtained when the (2-methyl-2:3-dihydrobenzofuran-7-yl-carbonyl)-acetic-(2'-N-methyl-N-octadecylamino-5'-carboxy)anilide used in the above example is replaced by 4-methoxybenzoylacetic-(2'-N-methyl-N-octadecylamino-5'-carboxy)anilide.

*Example 4*

In place of the 20 parts of 3-amino-4-N-methyl-N-octadecylaminobenzoic acid used in Example 1 there are used 9.3 parts of 2-chloro-5-trifluoromethylaniline. (2-methyl-2:3-dihydrobenzofuran-7-yl-carbonyl)acetic-(2'-chloro-5'-trifluoromethyl)anilide crystallises from ethanol in the form of fine needles which melt at 118°–119° C. On analysis the product is found to contain 57.5% of carbon, 4.3% of hydrogen and 3.7% of nitrogen (calculated for $C_{12}H_{15}NO_3ClF_3$, carbon=57.5%; hydrogen=3.9%; nitrogen=3.5%).

*Example 5*

In place of the 20 parts of 3-amino-4-N-methyl-N-octadecylaminobenzoic acid used in Example 1 there are used 8.0 parts of 2-methoxy-4-nitro-aniline. (2-methyl-2:3-dihydrobenzofuran-7-yl-carbonyl)acetic-(2'-methoxy-4'-nitro)anilide crystallises from ethanol in the form of bright yellow needles, which melt at 149°–150° C. On analysis the product is found to contain 61.9% of carbon, 4.9% of hydrogen and 7.2% of nitrogen (calculated for $C_{19}H_{18}O_6N_2$, carbon=61.6%; hydrogen =4.9%; nitrogen=7.6%).

*Example 6*

In place of the 20 parts of 3-amino-4-N-methyl-N-octadecylaminobenzoic acid used in Example 1 there are used 6.8 parts of α-naphthylamine. 2-methyl-2:3-dihydrobenzofuran-7-yl-carbonyl)-acetic-1'-naphthylamide crystallises from ethanol in the form of white needles which melt at 163–164° C. On analysis the product is found to contain 75.8% of carbon, 5.5% of hydrogen and 4.4% of nitrogen (calculated for $C_{22}H_{19}O_3N$; carbon=76.5%; hydrogen=5.5%; nitrogen =4.1%).

*Example 7*

18.7 parts of 3-amino-4-N-methyl-N-octadecylaminobenzoic acid are dissolved in 120 parts of xylene, the solution is stirred and heated at 160° C., and a mixture of 11.5 parts of ethyl-(2:3:4-trihydrobenzopyran-8-yl-carbonyl)acetate, 2 parts of pyridine and 30 parts of xylene is added over 20 minutes. Heating is continued and 30 parts of a mixture of xylene and ethanol are distilled off over 30 minutes. The mixture is then boiled under a reflux condenser for one hour and 65 parts of xylene are then distilled off during 40 minutes. The mixture is cooled and the solid which crystallises out, is filtered off, washed with 200 parts of ether and recrystallised from 110 parts of n-butanol. (2:3:4-trihydrobenzopyran-8-yl-carbonyl)-acetic-(2'-N-methyl-N-octadecylamino-5'-carboxy)anilide is obtained in the form of white needle-shaped crystals which melt at 142°–143° C. On analysis the product is found to contain 73.2% of carbon, 9.2% of hydrogen and 4.6% of nitrogen (calculated for $C_{38}H_{56}O_5N_2$, carbon=73.5%; hydrogen =9.1%; nitrogen=4.5%).

The ethyl (2:3:4-trihydro-benzopyran-8-yl-carbonyl)acetate used in the above example may be obtained by reacting a solution of 2:3:4-trihydrobenzopyran-8-yl-carbonyl chloride in benzene witht the sodium derivative of ethyl aceto-acetate by the method described in Organic Syntheses, collected volume 2 at page 266 for the preparation of ethyl benzoylacetate, and hydrolysing the ethyl (2:3:4-trihydrobenzopyran-8-yl-carbonyl)acetoacetate so formed with an alcoholic solution of ammonium hydroxide at 35°–40° C.

2:3:4-trihydrobenzopyran-8-yl-carbonyl chloride may itself be obtained by reacting together thionyl chloride and 2:3:4-trihydrobenzopyran-8-carboxylic acid, which may be obtained in an analagous manner to 2-methyl-2:3-dihydrobenzofuran-7-carboxylic acid by reacting chroman with n-butyl lithium and treating the reaction mixture with carbon dioxide.

*Example 8*

In place of the 20 parts of 3-amino-4-N-methyl-N-octadecylamino-benzoic acid used in Example 1 there are used 10 parts of 3:5-dicarbomethoxyaniline. (2-methyl - 2:3 - dihydrobenzofuran - 7 - yl - carbonyl) acetic-(3':5'-di-carbomethoxy)anilide crystallises from ethanol in the form of white needles, which melt at 168°–169° C. On analysis the product is found to contain 63.9% of carbon, 5.2% of hydrogen and 3.4% of nitrogen (calculated for $C_{22}H_{21}O_7N$, carbon=64.3%; hydrogen=5.1%; nitrogen=3.4%).

*Example 9*

5 parts of (2:3:4-trihydrobenzopyran-8-yl-carbonyl) acetic - (2' - N - methyl - N - octadecylamino - 5' - carboxy)anilide are suspended in 60 parts of chloroform and a solution of 1.08 parts of sulphuryl chloride in 5 parts of chloroform is added with stirring over 5 minutes. The resulting mixture is then stirred for 16 hours at 25° C. The chloroform is evaporated off, and the residue is crystallised from ethanol. α-Chloro-(2:3:4-trihydrobenzopyran - 8 - yl - carbonyl)acetic - (2' - N - methyl-N-octadecylamino-5'-carboxy)anilide is obtained in the form of white prisms, which melt at 129°–130° C. On analysis the product is found to contain 5.40% of chlorine (calculated for $C_{38}H_{55}O_5N_2Cl$, chlorine=5.43%).

*Example 10*

In place of the 18.7 parts of 3-amino-4-N-methyl-N-octadecylaminobenzoic acid used in Example 7 there are used 9.8 parts of 4-(4'-chlorophenoxy)aniline. (2:3:4-trihydrobenzopyran - 8 - yl - carbonyl)-acetic - (4':4"-chloro-phenoxy)anilide crystallises from n-butanol in the form of white plates which melt at 161°–162° C. On analysis the product is found to contain 68.2% of carbon, 4.5% of hydrogen and 3.0% of nitrogen (calculated for $C_{24}H_{20}O_4NCl$; carbon=68.4%; hydrogen=4.8%; nitrogen=3.3%).

*Example 11*

In place of the 18.7 parts of 3-amino-4-N-methyl-N-octadecylaminobenzoic acid used in Example 7 there are used 6.15 parts of 2-methyl-5-methoxy-aniline. (2:3:4-trihydrobenzopyran - 8 - yl - carbonyl) - acetic - (2-methyl-5-methoxy)anilide, after recrystallisation from ethanol, melts at 157°–158° C. On analysis the product is found to contain 70.8% of carbon, 6.2% of hydrogen and 3.9% of nitrogen (calculated for $C_{20}H_{21}O_4N$, carbon=70.8%; hydrogen=6.2%; nitrogen=4.1%).

*Example 12*

9.08 parts of 3-amino-4-N-methyl-N-octadecylamino benzene sulphonic acid are added with stirring over 15 minutes to a mixture of 1.08 parts of anhydrous sodium carbonate and 25 parts of pyridine at 120° C. A solution of 5 parts of ethyl (2:3:4-trihydrobenzopyran-8-yl-carbonyl)acetate in 5 parts of pyridine is then added and the mixture is stirred and boiled under a reflux condenser for 2½ hours. 15 parts of pyridine are then distilled off and the residue is cooled and poured into a mixture of 300 parts of cold water and 28 parts of a concentrated aqueous solution of hydrochloric acid. The solid so obtained is washed with a 10% aqueous solution of hydrochloric acid by decantation then washed with water, and dried. The solid is dissolved in methanol and a methanolic solution of sodium acetate is added until the mixture is no longer acid to Congo Red. The precipitated solid is filtered off and dried. The sodium salt of (2:3:4-trihydrobenzopyran-8-yl-carbonyl)acetic-(2'-N-methyl-N-octadecylamino)anilide-5'-sulphonic acid crystallises from methanol in the form of off-white micro prisms which decompose without melting at 290° C. On analysis the product is found to contain 4.3% of nitrogen (calculated for $C_{37}H_{55}O_6N_2SNa$, nitrogen=4.1%).

*Example 13*

A mixture of 2 parts of (2-methyl-2:3-dihydrobenzofuran - 7 - yl - carbonyl)acetic - (2' - methoxy - 4' - nitro)anilide, 10 parts of water and 10 parts of ethanol is stirred at the boil under a reflux condenser. 5 parts of sodium hydrosulphite is then added gradually over 15 minutes and the mixture heated for a further hour. The mixture is cooled, poured into 100 parts of water and extracted twice with 50 parts of chloroform. The chloroform extracts are dried and the chloroform removed by distillation. The residual solid is crystallised from ethanol when (2-methyl-2:3-dihydrobenzofuran-7-yl-carbonyl) acetic-(2'-methoxy-4'-amino)anilide is obtained melting at 149°–151° C.

*Example 14*

4 parts of (2-methyl-2:3-dihydrobenzofuran-7-yl-carbonyl)acetic-(2'-methoxy-4'-amino)anilide and 10 parts of sodium acetate are dissolved in 50 parts of glacial acetic acid. 2.4 parts of acetic anhydride are then added and the mixture heated for 30 minutes at 100° C. The mixture is cooled, poured into 500 parts of cold water and the precipitated solid is filtered off, washed with water and dried. (2-methyl-2:3-dihydrobenzofuran-7-yl-carbonyl)acetic - (2' - methoxy - 4' - acetaminoanilide) crystallises from a mixture of ethanol and water in the form of colourless prisms which melt at 209°–211° C. On analysis the product is found to contain 66.0% of carbon, 5.9% of hydrogen and 7.1% of nitrogen (calculated for $C_{21}H_{21}O_5N_2$; carbon=66.2%; hydrogen=5.5%; nitrogen=7.3%).

*Example 15*

In place of the 18.7 parts of 3-amino-4-N-methyl-N-octadecylaminobenzoic acid used in Example 7 there are used 7.9 parts of 2-methoxy-5-nitroaniline. (2:3:4-trihydrobenzopyran - 8 - yl - carbonyl)acetic - (2' - methoxy-5'-nitro)anilide crystallises from ethanol in the form of yellow crystals which melt at 168–170° C.

*Example 16*

A mixture of 8 parts of (2:3:4-trihydrobenzopyran-8-yl-carbonyl)acetic-(2'-methoxy-5'-nitro)anilide, 2 parts of Raney nickel catalyst and 250 parts of methanol is stirred in an autoclave and hydrogen passed into the autoclave until a pressure of 60 atmospheres is obtained. The mixture is stirred at 60° C. for 3 hours, then cooled and the mixture filtered. The filtrates are evaporated to dryness and the residual solid crystallised from ethanol. (2:3:4 - trihydrobenzopyran - 8 - yl - carbonyl)acetic-(2'-methoxy-5'-nitro)anilide is obtained in the form of greyish-white crystals which melt at 165°–169° C.

*Example 17*

3.4 parts of (2:3:4-trihydrobenzopyran-8-yl-carbonyl) acetic(2'-methoxy-5'-amino)anilide and 2 parts of sodium acetate are dissolved in 50 parts of acetic acid. 1.41 parts of benzoyl chloride are then added and the mixture is stirred for 2½ hours at 20° C. 250 parts of water are added and the precipitated solid is filtered off, washed with water and dried. (2:3:4-trihydrobenzopyran-8-yl-carbonyl)acetic - (2' - methoxy - 5' - benzoylamino) anilide crystallises from a mixture of water and dimethyl formamide in the form of colourless needles which melt at 225°–228° C. On analysis this product is found to contain 69.8% of carbon, 5.5% of hydrogen, and 6.5% of nitrogen (calculated for $C_{26}H_{24}O_5N_2$, carbon=70.3%; hydrogen=5.4%; nitrogen=6.3%).

What I claim is:

A compound of the formula:

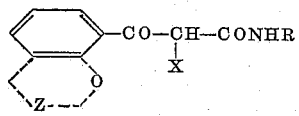

wherein R represents an aryl radical selected from the group consisting of the phenyl radical, the naphthyl radical and the phenyl radical substituted with at least one substituent selected from the group consisting of methoxy, carboxy, N-methyl-N-octadecylamino, diethylsulphonamido, nitro, acetamino, benzoylamino, amino, carbomethoxy, chlorophenoxy, methyl, trifluoromethyl, and sulpho groups and chlorine atoms, Z represents a divalent grouping selected from the class consisting of —$CH_2CH_2$— and —$CH_2CH_2CH_2$— groups and X is selected from the class consisting of hydrogen and chlorine atoms.

References Cited in the file of this patent

UNITED STATES PATENTS

| | | |
|---|---|---|
| 2,435,173 | Bavley | Jan. 27, 1948 |
| 2,507,473 | Koelsch | May 9, 1950 |
| 2,636,885 | Wynn et al. | Apr. 28, 1953 |
| 2,694,635 | Salminen et al. | Nov. 16, 1954 |